(12) United States Patent
Katsuda

(10) Patent No.: US 7,978,966 B2
(45) Date of Patent: Jul. 12, 2011

(54) IMAGE CAPTURING DEVICE

(75) Inventor: Osamu Katsuda, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/457,945

(22) Filed: Jun. 25, 2009

(65) Prior Publication Data

US 2009/0323187 A1   Dec. 31, 2009

(30) Foreign Application Priority Data

Jun. 26, 2008 (JP) ................. 2008-167279
Jun. 15, 2009 (JP) ................. 2009-141955

(51) Int. Cl.
*G03B 17/00*    (2006.01)
(52) U.S. Cl. ......................................... 396/52; 396/448
(58) Field of Classification Search .................. 396/52, 396/448; 348/208.11
See application file for complete search history.

(56) References Cited

U.S. PATENT DOCUMENTS

| | | | |
|---|---|---|---|
| 7,609,315 B2* | 10/2009 | Kawai | 348/340 |
| 7,639,301 B2* | 12/2009 | Niwamae et al. | 348/335 |
| 7,724,299 B2* | 5/2010 | Kawai | 348/340 |
| 2008/0158406 A1* | 7/2008 | Ito | 348/335 |

FOREIGN PATENT DOCUMENTS

| | | |
|---|---|---|
| JP | 2003-348397 | 12/2003 |
| JP | 2008-28665 | 2/2008 |

* cited by examiner

*Primary Examiner* — Rodney E Fuller

(57) ABSTRACT

An image capturing device includes an imaging element that captures an image of a photographic subject, an optical member that is disposed over an imaging surface of the imaging element, a vibration application member that applies vibration to the optical member, and a support assembly including a non-metallic first support member and a non-metallic second support member for supporting the optical member. The first support member and the second support member are configured to follow the deformation of the vibrating optical member with individual speeds different from each other.

24 Claims, 10 Drawing Sheets

IMAGE CAPTURING DEVICE

INCORPORATION BY REFERENCE

The disclosures of the following priority applications are herein incorporated by reference:

Japanese Patent Application No. 2008-167279 filed on Jun. 26, 2008; and

Japanese Patent Application No. 2009-141955 filed on Jun. 15, 2009.

BACKGROUND OF THE INVENTION

1. Field of the Invention

The present invention relates to an image capturing device.

2. Description of Related Art

A technique is per se known (refer to Japanese Laid-Open Patent Publication No. 2003-348397) for preventing dust from adhering to an anti-dust member that seals and protects the imaging surface side of an imaging element, by vibrating that anti-dust member. In this document it is disclosed to join together the anti-dust member and a holding member for the anti-dust member by a soft member, thus connecting them together in an airtight manner, so that thereby attenuation of the vibration of the anti-dust member is prevented.

In this prior art technique, no consideration is given to the speed at which the soft member follows the deformation of the anti-dust member due to vibration, so that there is the problem that, if it is simply a member that is soft but has no other special characteristics, then the vibration performance may be deteriorated.

SUMMARY OF THE INVENTION

An image capturing device according to a first aspect of the present invention comprises: an imaging element that captures an image of a photographic subject; an optical member that is disposed over an imaging surface of the imaging element; a vibration application member that applies vibration to the optical member; and a support assembly including a non-metallic first support member and a non-metallic second support member for supporting the optical member, the first support member and the second support member being configured to follow the deformation of the vibrating optical member with individual speeds different from each other.

According to a second aspect of the present invention, in the image capturing device of the first aspect, it is preferred that the support assembly holds the optical member between the first support member and the second support member, the second support member is disposed on a side of the optical member facing towards the imaging element, and the first support member is disposed on a side of the optical member opposite to the side on which the second support member is disposed.

According to a third aspect of the present invention, in the image capturing device of the first or second aspect, it is preferable that the speed with which the second support member follows the deformation of the optical member is faster than the speed with which the first support member follows the deformation of the optical member.

According to a fourth aspect of the present invention, in the image capturing device of any one of the first through third aspects, it is preferred that the vibration application member applies vibration to the optical member on a side facing away from the imaging element.

According to a fifth aspect of the present invention, in the image capturing device of any one of the first through fourth aspects, it is preferable that, in the support assembly, at least the first support member is made of a foam material.

According to a sixth aspect of the present invention, in the image capturing device of the fifth aspect, the second support member may also be made of a foam material in the support assembly.

According to a seventh aspect of the present invention, in the image capturing device of any one of the first through sixth aspects, it is preferred that the first support member is arranged to extend along the vibration application member.

According to an eighth aspect of the present invention, in the image capturing device of any one of the first through seventh aspects, the second support member may also serve as a shielding member that closes a space defined between the optical member and the imaging element.

According to a ninth aspect of the present invention, in the image capturing device of any one of the first through eighth aspects, it is preferable that the vibration application member applies vibration to the optical member so that the optical member vibrates at a frequency that the first support member does not follow, and that the second support member does follow.

An image capturing device according to a tenth aspect of the present invention comprises: an imaging element that captures an image of a photographic subject; an optical member that is disposed over an imaging surface of the imaging element; a vibration application member that applies vibration to the optical member; and a support member that supports the optical member, and that is made of a foam material.

With the image-capturing device according to the present invention, it is possible to suppress decrease of the performance during vibration in an appropriate manner.

DESCRIPTION OF PREFERRED EMBODIMENTS

In the following, preferred embodiments for implementation of the present invention will be explained with reference to the drawings.

Embodiment 1

Figure 1:
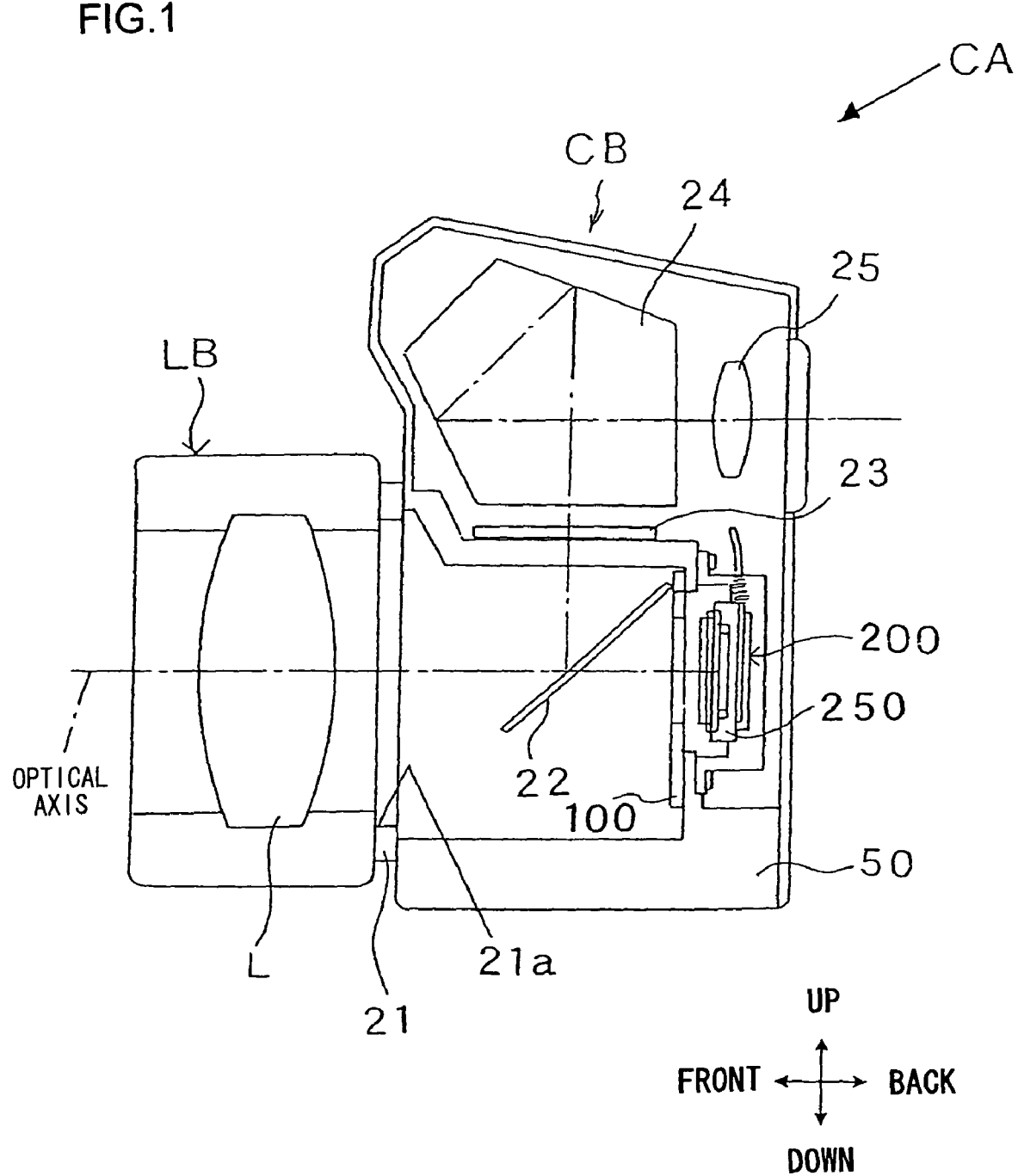
FIG. 1 is a sectional view of a digital camera as seen from its side.

A digital camera according to a first embodiment of the present invention will now be explained with reference to FIGS. 1 through 7. FIG. 1 is a sectional view of this digital camera as seen from its side. It should be understood that, for the sake of convenience of explanation, the directions front and back, left and right, and up and down are defined as shown the figures. The left and right directions are defined so as to agree with the left and right directions when this digital camera is seen from the front. This digital camera CA is an interchangeable lens type single lens reflex camera, and an interchangeable lens LB including a photographic lens L is installed to the camera main body CB via a lens mount 21. A light flux from the photographic subject that passes through the photographic lens L is conducted into the camera main body CB through an aperture 21a of the lens mount 21, and is reflected by a mirror 22 and imaged upon a view finder screen 23, and may be observed via a pentaprism 24 and an eyepiece lens 25.

When release operation is performed, the mirror 22 is raised up out of the way and retracted from the photographic optical path, and then a focal plane shutter 100, which is a shutter device, is driven. At this time, the light flux transmitted through the photographic lens L is incident upon an imaging element 250 such as a CCD or the like that is provided to an image-capturing unit 200. Photoelectric conversion output of this imaging element 250 is subjected to various different types of processing by an image processing unit that will be described hereinafter, and thereby digital image data is generated. It should be understood that the imaging element 250 need not be a CCD; it would also be acceptable to utilize some other type of imaging element, for example a CMOS sensor.

Figure 2:
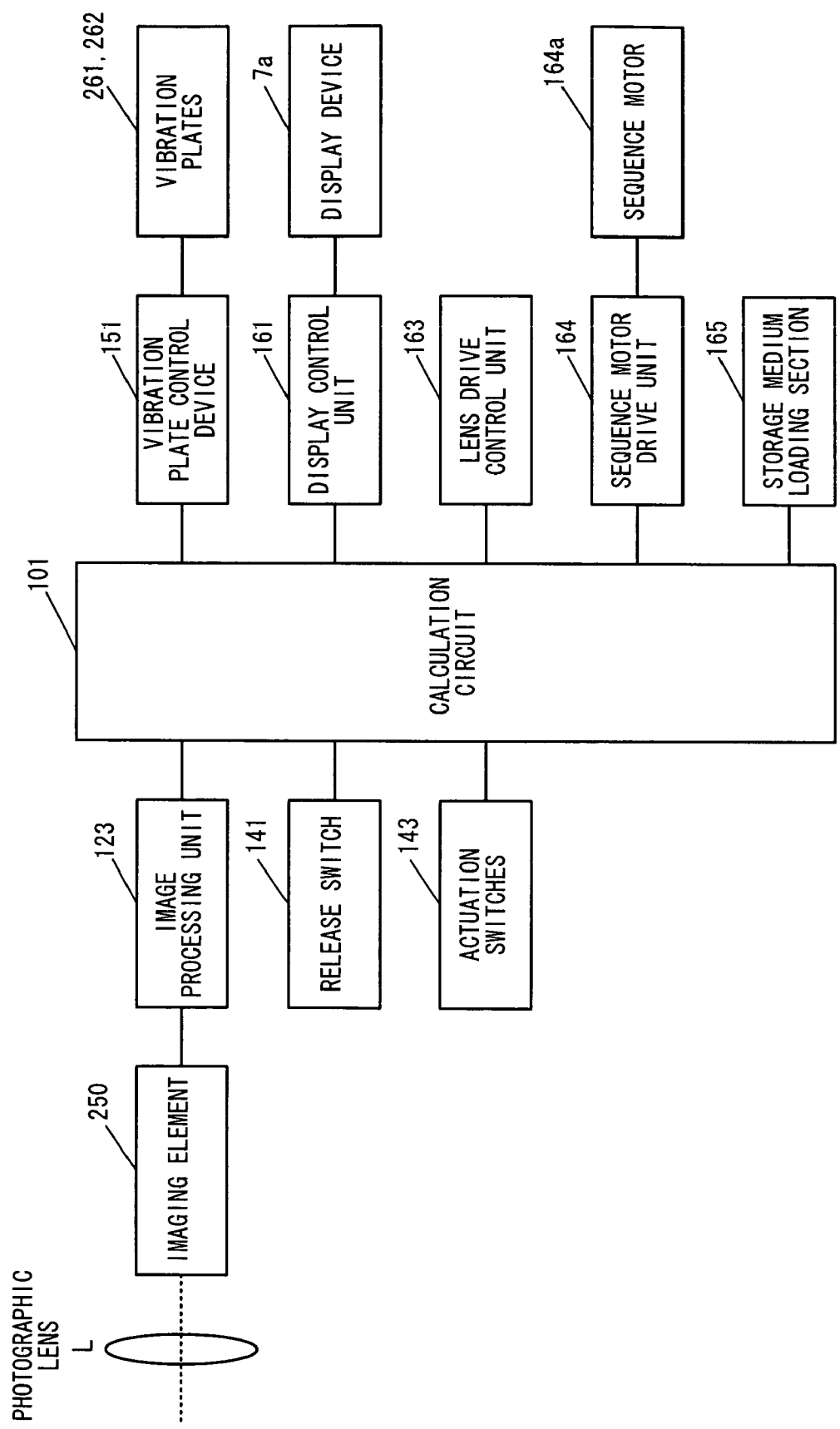
FIG. 2 is a block diagram for explanation of the structure of this digital camera.

FIG. 2 is a block diagram for explanation of the functional structure of this digital camera CA. A calculation circuit 101 consists of a microcomputer and the like. This calculation circuit 101 inputs signals that are outputted from various sections of the camera as will be described hereinafter, performs predetermined calculations thereupon, and outputs control signals to various sections of the camera on the basis of the results of calculation. The calculation circuit 101 and various sections that will be described hereinafter are mutually connected together.

The imaging element 250 captures an image created by the light flux from the photographic subject that has passed through the photographic lens L, and outputs an image capture signal to an image processing unit 123. The image processing unit 123 includes an A/D conversion circuit or an ASIC or the like. This image processing unit 123 converts the analog image capture signal to a digital signal, and performs image processing upon the image data after this digital conversion, such as white balance processing and the like. Moreover, the image processing unit 123 performs compression processing according to a predetermined format upon the image data after image processing, or decompression processing to expand image data that has been compressed, and so on.

A release switch 141 that is operated by a release button not shown in the figures outputs a release actuation signal to the calculation circuit 101. This release actuation signal can either be a half press actuation signal that corresponds to half press actuation of the release button when it is lightly depressed, or a full press actuation signal that corresponds to full press actuation of the release button when it is more deeply depressed. And actuation switches 143 are a group of switches that are actuated by various actuation buttons not shown in the figures that are provided upon the camera main body CB, and that output individual actuation signals to the calculation circuit 101.

A vibration plate control device 151 drives vibration plates 261 and 262 that will be described hereinafter on the basis of a signal output from the calculation circuit 101. A display control unit 161 performs display control of a display device 7a provided, for example, upon the rear surface of the camera main body CB, on the basis of a signal output from the calculation circuit 101. A lens drive control unit 163 drives a lens group (the photographic lens L) of the interchangeable lens LB on the basis of a signal output from the calculation circuit 101, so as to perform focusing operation or focal length change operation. A sequence motor drive unit 164 drives a sequence motor 164a on the basis of a signal output from the calculation circuit 101. This sequence motor 164a is a motor for performing rotation of the mirror 22 and charging operation for the focal plane shutter 100 and so on.

A storage medium loading section 165 holds a storage medium not shown in the figures in a removable manner, and performs reading in of data recorded upon the loaded storage medium, deletion of data from the storage medium, and writing of data onto the storage medium. Image data after image processing, and the like, is recorded upon the storage medium. It should be understood that descriptions of a magnet for starting the operation of the focal plane shutter 100 and of a photometric sensor for exposure control and so on are omitted, because these elements have no direct relationship with the invention of the present application.

The Image-Capturing Unit

Figure 3:
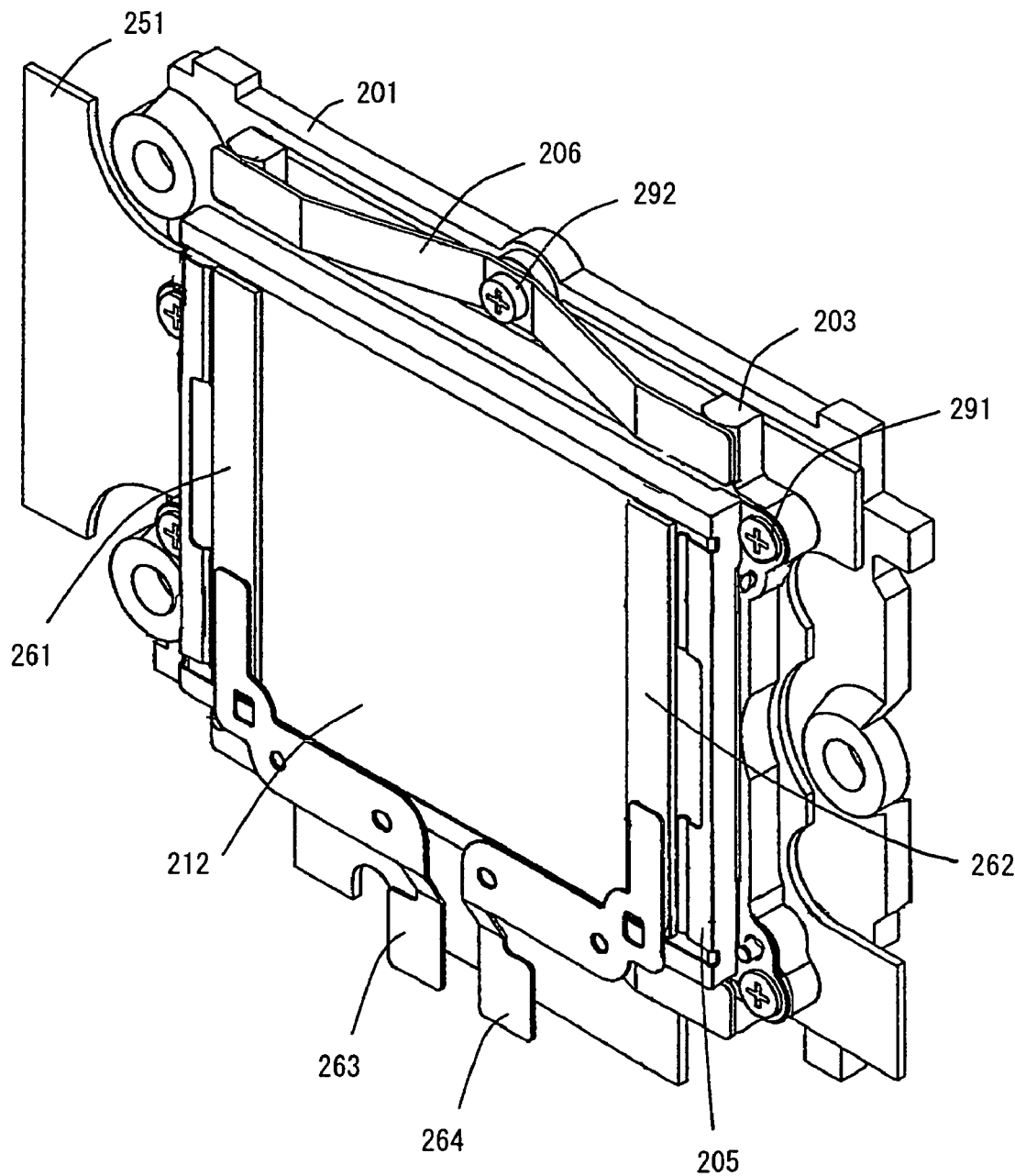
FIG. 3 is a perspective view of an image-capturing unit.
Figure 4:
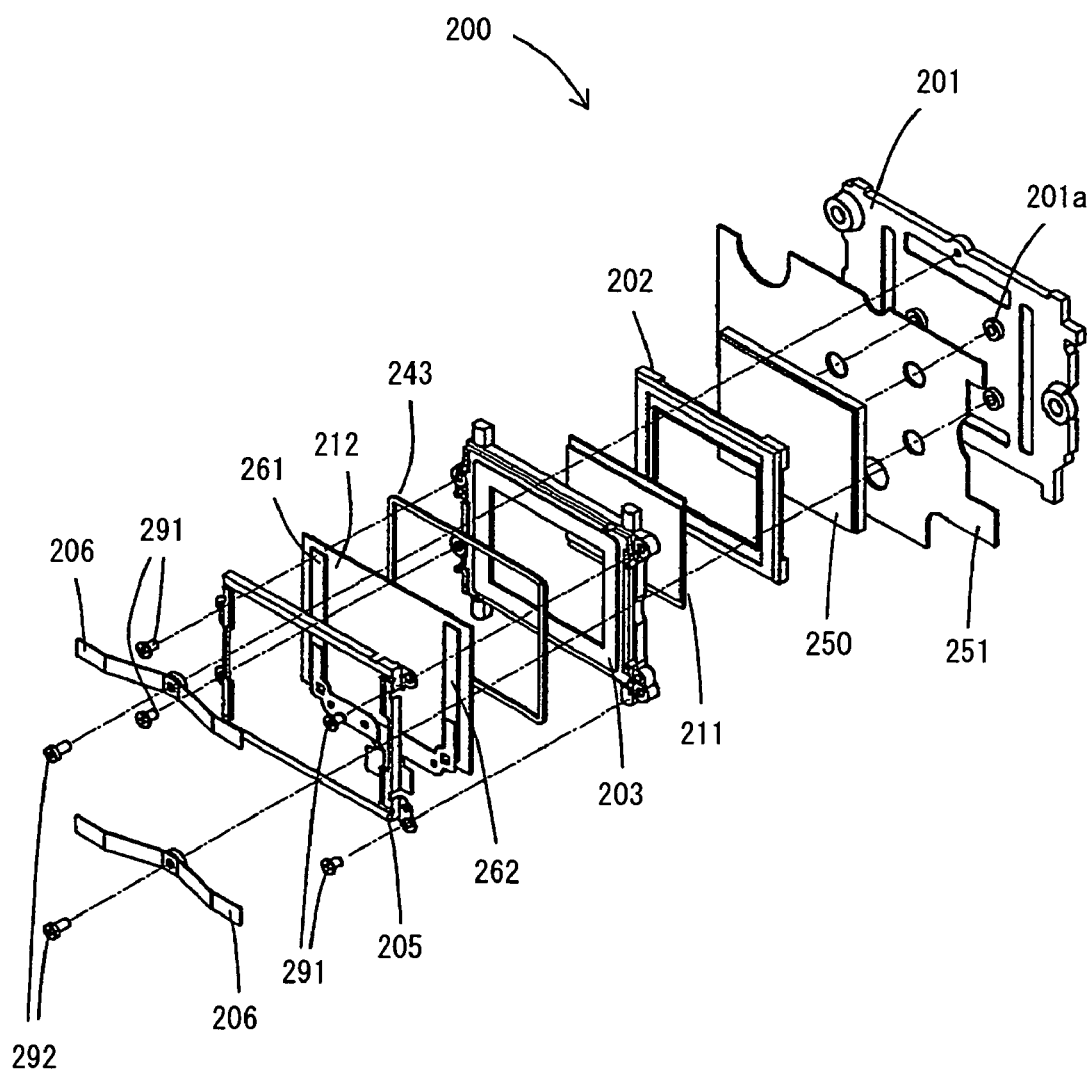
FIG. 4 is an exploded view of this image-capturing unit.

FIG. 3 is a perspective view of the image-capturing unit 200, while FIG. 4 is an exploded view of this image-capturing unit 200. As shown in FIGS. 3 and 4, this image-capturing unit 200 includes a holder 201, an image-capturing substrate 251, the imaging element 250, a mask 202, a first low pass filter 211, a fixing member 203, a sealing member 243, a second low pass filter 212, a low pass filter pressing frame 205 for pressing the low pass filters, and fixing member pressing springs 206 for pressing the fixing member 203. The holder 201 is a member by which the imaging element 250, the image-capturing substrate 251, the fixing member 203 and so on are held. The image-capturing substrate 251 is a substrate to which the imaging element 250 is connected, and is connected to the image processing unit 123 described above.

The imaging element 250 is a solid-state imaging element such as a CCD as described above or the like. While in the state of being electrically connected to the image-capturing substrate 251, the imaging element 250 is fixed by being adhered to convex portions of the holder 201, designated in FIG. 4 by the reference symbol 201a. The mask 202 is a frame shaped member that is made of an elastic material such as, for example, rubber or the like, and is disposed at the front side of the imaging element 250. This mask 202 performs three functions: (a) it stops light flux from the photographic subject from getting into regions other than an image-capturing region on the imaging element 250; (b) it prevents the ingress of foreign matter such as dust into a space between the first low pass filter 211 and the imaging element 250 that will be described hereinafter; and (c) it determines the position of the first low pass filter 211 with respect to the imaging element 250.

The first low pass filter 211, for example, may be an optical member in which a birefringent plate, a ¼ wavelength plate, and an infra-red cutoff glass plate are laminated together. This first low pass filter 211 not only cuts out infrared radiation, but also prevents the occurrence of moire patterns and the like. The first low pass filter 211 is positionally determined and fixed with respect to the imaging element 250 by being pressed against the mask 202 by the biasing force of the fixing member pressing springs 206, via the fixing member 203 that will be described hereinafter.

The fixing member 203 is a member to which the second low pass filter 212, the sealing member 243, and the low pass filter pressing frame 205 are fixed, and that also presses the first low pass filter 211 and the mask 202 towards the holder 201. The sealing member 243 is a frame shaped member that is made of an elastic material such as, for example, rubber or the like, and that is fitted between the fixing member 203 and the second low pass filter 212 and determines the position of the second low pass filter 212 with respect to the fixing member 203.

The second low pass filter 212 is an optical member made of a birefringent plate whose structure is similar to that of the first low pass filter 211 described above, and also functions to prevent moire patterns and the like. Vibration plates 261 and 262 that will be described hereinafter are adhered and fixed in the neighborhood of the left and right edges of the front surface of the second low pass filter 212.

Figure 5:
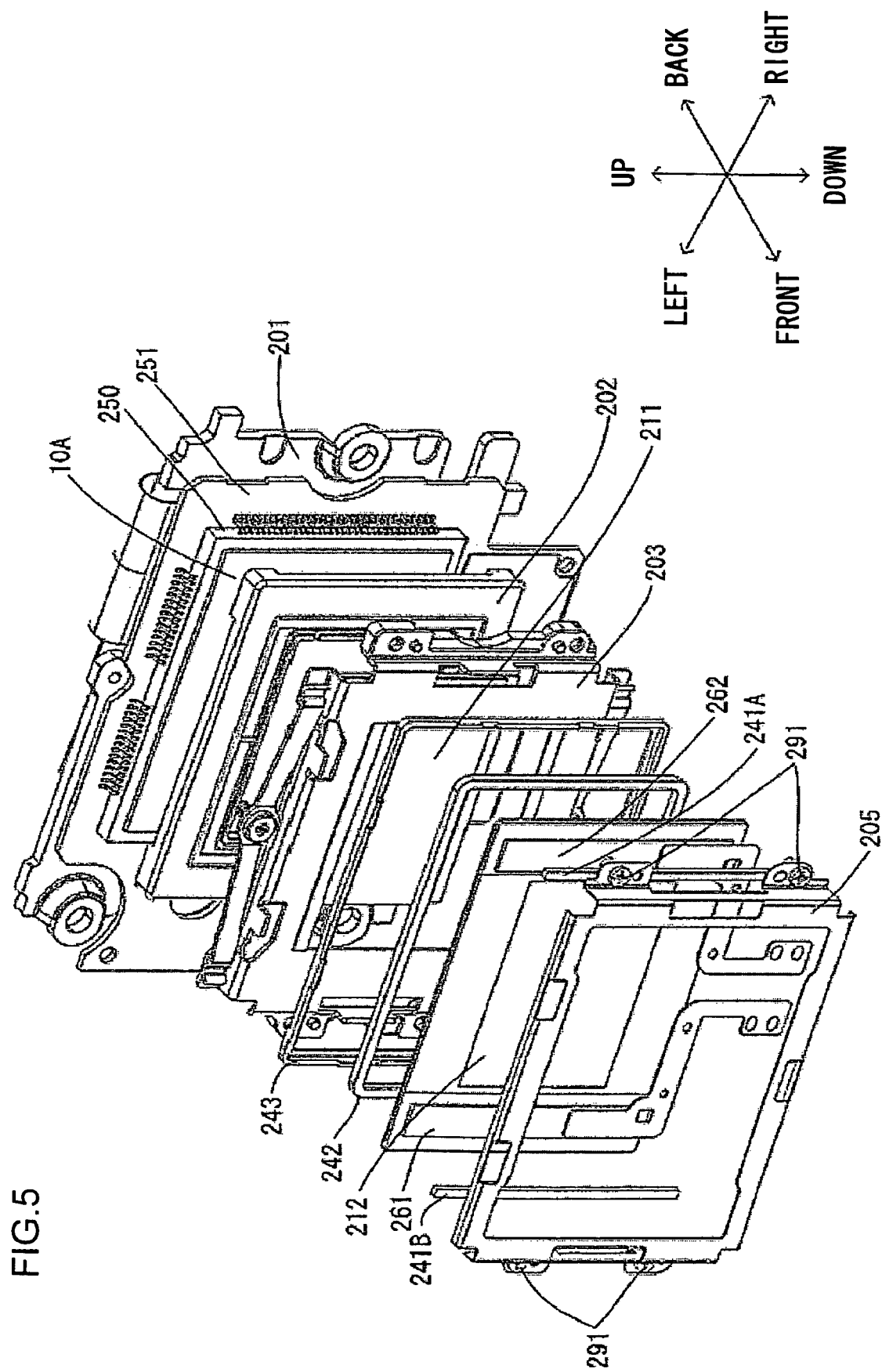
FIG. 5 is an enlarged figure showing principal portions of the FIG. 4 structure.

FIG. 5 is an enlarged view of principal portions of the exploded view shown by way of example in FIG. 4. The vibration plate 261 is disposed on the left side of the front surface of the second low pass filter 212, while the vibration plate 262 is disposed on the right side of the front surface of the second low pass filter 212.

The low pass filter pressing frame 205 is a frame shaped member of approximately rectangular shape for sandwiching the second low pass filter 212 against the fixing member 203. This low pass filter pressing frame 205 is fixed to the fixing member 203 with screws 291 or the like. At this time, by inserting a first foam member 241 (actually, two separate members 241A and 241B) and a second foam member 242 before and after the second low pass filter 212 respectively, the second low pass filter 212 is supported by the first foam members 241A and 241B and the second foam member 242, so as to be sandwiched between the fixing member 203 and the low pass filter pressing frame 205.

Figure 6:
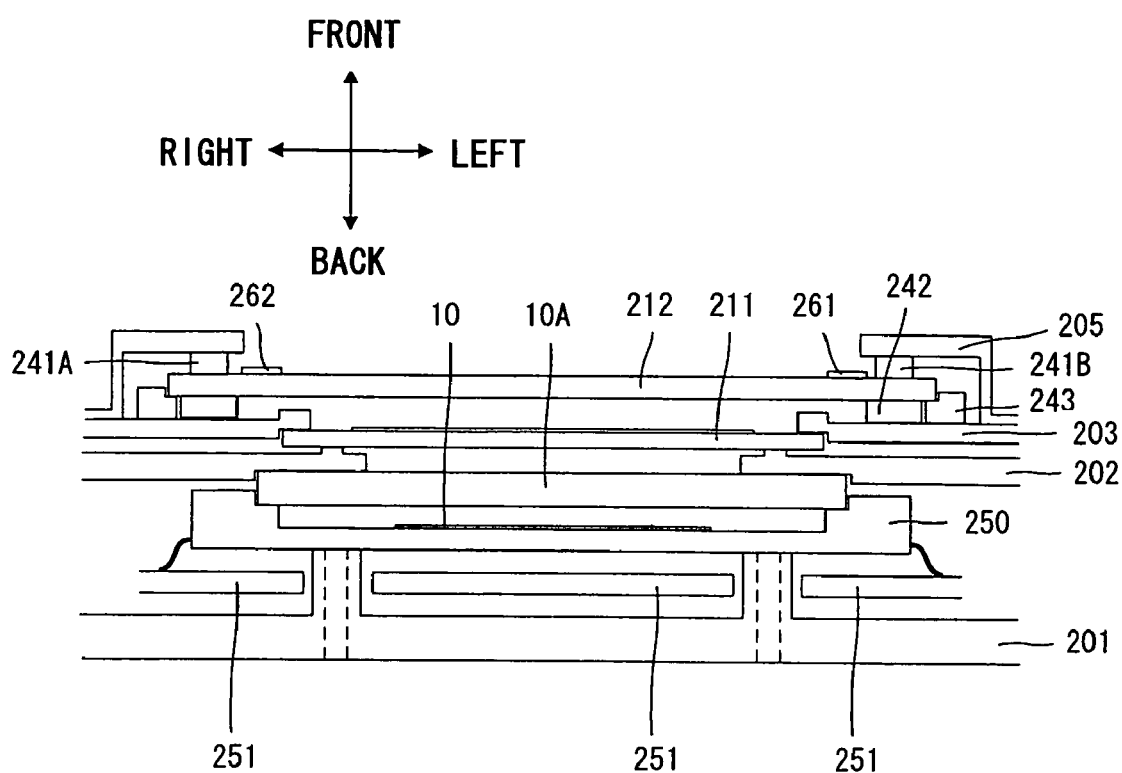
FIG. 6 is a figure showing an example of a cross section of the image-capturing unit, as seen from above.

The way in which the second low pass filter 212 is sandwiched between the first foam members 241A and 241B and the second foam member 242 will now be explained with reference to FIG. 6. FIG. 6 is a schematic figure showing, by way of example, a cross section of the image-capturing unit as seen from above. It should be understood that for convenience of understanding, in this figure, the structure is shown as enlarged in the fore and aft direction as compared with its actual extent.

In FIG. 6, a cover glass 10A is provided so as to cover the imaging surface 10 upon the imaging element 250, and the mask 202 is disposed over that cover glass 10A (i.e., in front of it). And the first low pass filter 211 is pressed in the direction of the cover glass 10A (i.e., rearwards) by the fixing member 203.

As described above, the sealing member 243 is a frame shaped member that is made of rubber or the like. The second foam member 242 is a frame shaped member that may be made of, for example, a urethane type foam substance such as Poron (trademark) or the like. And the first foam members 241A and 241B that are disposed over (i.e., in front of) the second low pass filter 212 are straight members that may be made of, for example, an olefin type foam substance such as SCF (trademark) or the like. Or, instead of using foam for the first members 241A and 241B and the second member 242, it would also be acceptable to use a material such as flocked paper or a super elastic alloy using a shape memory alloy or the like. Thus while, in this specification, for the sake of convenience, these members 241A, 241B, and 242 are referred to as "foam members", this should not be considered as being limitative of the actual material from which they are formed. The first foam member 241A is disposed parallel to the vibration plate 262, while the second foam member 241B is disposed parallel to the vibration plate 261.

The first foam members 241A and 241B and the second foam member 242 are made so that, in the state in which the low pass filter pressing frame 205 is fixed to the fixing member 203, their thicknesses in the fore-and-aft direction are crushed by predetermined amounts. Due to this, the first foam members 241A and 241B and the second foam member 242 can sandwich the second low pass filter 212 between them at a predetermined pressure. In other words, by the first foam members 241A and 241B and the second foam member 242 being compressed at individual predetermined compression ratios with respect to their original thicknesses, predetermined resilience forces (restoring forces) corresponding to these compression ratios are generated by both the first foam members 241A and 241B and the second foam member 242, and these resilience forces operate to sandwich the second low pass filter 212.

Figure 7:
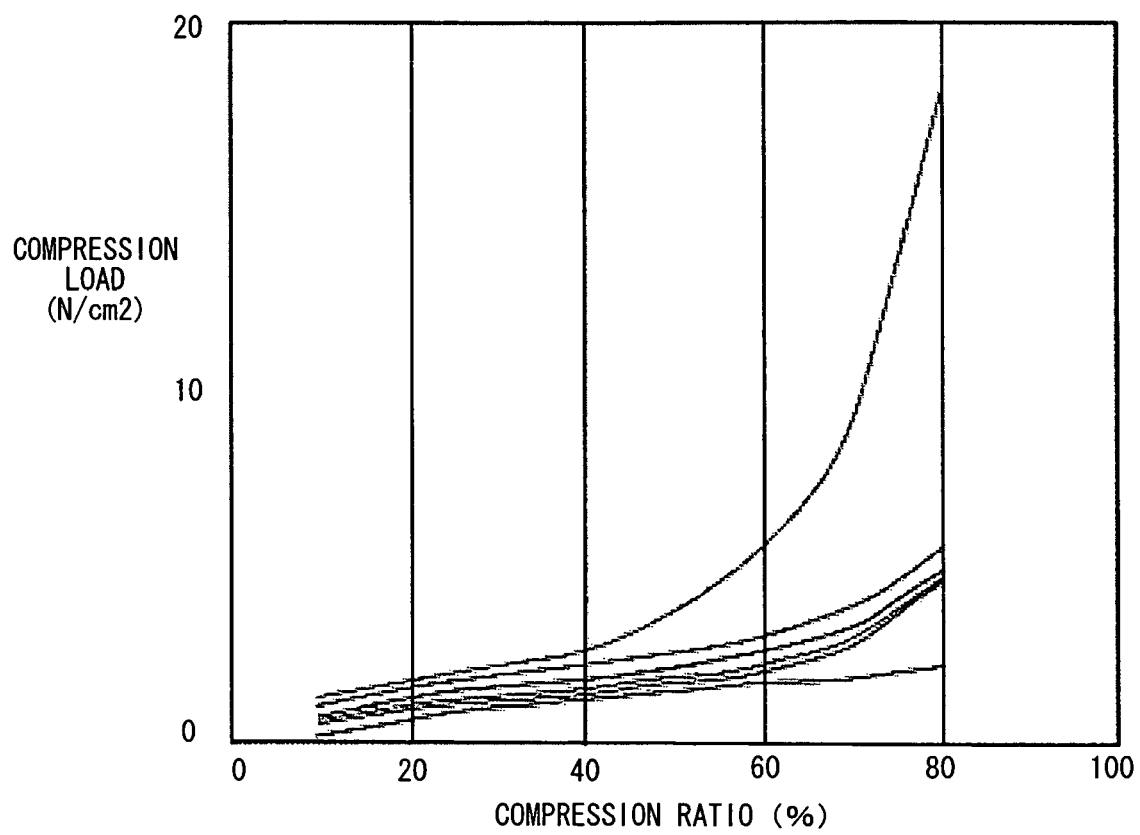
FIG. 7 is a figure showing an example of a graph that displays relationships, for various types of foam material, between compression load and compression ratio.

It should be understood that, when the low pass filter pressing frame 205 is fixed to the fixing member 203, it is desirable for the compression ratios for the first foam members 241A and 241B and the second foam member 242 to be within a range in which their characteristics as foam are not deteriorated. This will now be explained in the following with reference to FIG. 7. FIG. 7 shows an example of graphs that display the relationships between the compressive load upon various types of foam material that may be used for the first foam members 241A and 241B and the second foam member 242, and compression ratio. In this figure, in the region in which the compression ratio is greater than about 70%, the graphs for all the foam materials are linear. In this type of linear region, the characteristics of the materials as foam are lost because the air bubbles in the interior of the foam material are destroyed (that is undesirable), and it is considered that, when the second low pass filter 212 is made to vibrate as will be described hereinafter, the foam members 241A, 241B, and 242 may easily cause undesirable attenuation of such vibration, since such a high level of compression makes these foam members exhibit behavior similar to that of a conventional elastic material such as rubber or the like. Accordingly, by setting the compression ratios of the foam members so as to keep them within the range of the non-linear region of the graph for low compression ratio below 70%, it is possible to ensure that their characteristics as foam materials are not lost.

The shape of the low pass filter pressing frame 205 may be designed so that, if for example the original thicknesses of the first foam members 241A and 241B and the second foam member 242 are all 0.5 mm, then after the low pass filter pressing frame 205 has been fixed to the fixing member 203 these thicknesses are reduced to 0.2~0.3 mm; or alternatively so that, if for example the original thicknesses of the first foam members 241A and 241B and the second foam member 242 are all 1.0 mm, then, after the low pass filter pressing frame 205 has been fixed to the fixing member 203 these thicknesses are reduced to 0.4~0.6 mm. Due to this construction, it is possible to keep the compression ratios of these foam members within the non-linear region in which their compression ratios are 40%~60%.

In FIGS. 3 and 4, the fixing member pressing springs 206 are spring members for fixing the fixing member 203 to the holder 201. These fixing member pressing springs 206 are fitted to the holder 201 by screws 292. Due to this, the fixing member 203 is fixed to the holder 201 (refer to FIG. 3), while moreover the fixing member 203 to which the low pass filter pressing frame 205 is fitted is biased towards the holder 201.

Furthermore, when the fixing member pressing springs 206 are fixed to the holder 201 by the screws 292, then, as described above, the fixing member 203 that is biased by the fixing member pressing springs 206 presses the first low pass filter 211 and the mask 202 towards the holder 201 and fixes them thereto. By this construction, the image-capturing substrate 251, the imaging element 250, the mask 202, the first low pass filter 211, the fixing member 203, the sealing member 243, and the second low pass filter 212 are all fixed to the holder 201. And the holder 201 to which all these members are fixed, i.e. the image-capturing unit 200, is fitted to the camera main body CB and fixed thereto.

According to the structure explained above, sealed spaces are defined from the front surface of the cover glass 10A of the imaging element 250 to the rear surface of the first low pass filter 211, and from the front surface of the first low pass filter 211 to the rear surface of the second low pass filter 212. Accordingly, foreign matter cannot get into these spaces from the exterior. However, since the front surface of the second low pass filter 212 is exposed to the space within the camera main body CB, sometimes it may happen that dust or the like may adhere thereto. Thus, with the digital camera CA of this embodiment, the second low pass filter 212 is vibrated by vibrating the vibration plates 261 and 262, and thereby any foreign matter that has adhered to the front surface of the second low pass filter 212 is shaken off and falls down.

Elimination of Dust

Now the operation for eliminating dust that has adhered to the second low pass filter 212 will be explained. The vibration plates 261 and 262 are made of piezoelectric elements. As shown by way of example in FIG. 3, these vibration plates 261 and 262 are disposed in the neighborhood of the left and right edges of the front surface of the second low pass filter 212, and extend in the vertical direction along the short sides of the second low pass filter 212. Each of the vibration plates 261 and 262 is electrically connected by its own respective flexible printed circuit (FPC) 263 and 264 to the vibration plate control device 151 (refer to FIG. 2). And the vibration plates 261 and 262 are vibrated when drive signals of a predetermined frequency are supplied to them from the vibration plate control device 151. This vibration is transmitted to the second low pass filter 212, and thus the second low pass filter 212 itself is shaken.

Figure 8A:
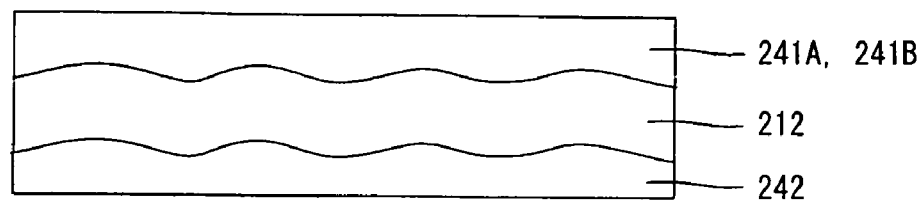
FIG. 8A is a figure showing an example of how a second low pass filter initially starts to vibrate.
Figure 8B:
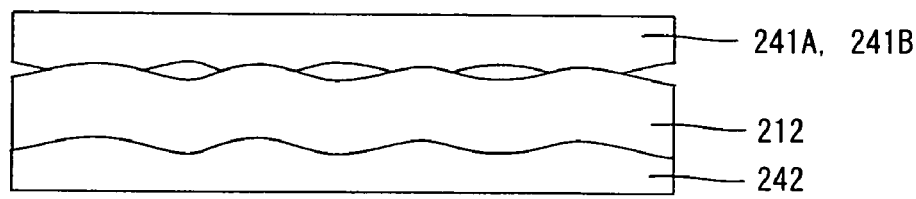
FIG. 8B is a figure showing an example of a subsequent vibration state thereof.
Figure 8C:
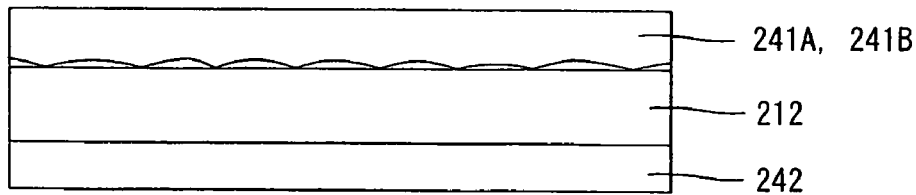
FIG. 8C is a figure showing an example of how it appears at the moment at which it stops vibrating.

FIGS. 8A through 8C are figures for explanation of the way in which the second low pass filter 212 vibrates at its portions that are sandwiched between the first foam members 241A and 241B and the second foam member 242. FIG. 8A is a figure showing an example of the way in which the vibration initially starts; FIG. 8B is a figures showing an example of the next state of vibration; and FIG. 8C is a figure showing an example of the moment when the vibration stops. During the vibration (in other words, while the dust is being eliminated), the sequence from the state of FIG. 8B to the state of FIG. 8C and then the sequence from the state in reverse to FIG. 8B to the state of FIG. 8C are repeated.

According to FIGS. 8B and 8C, since the first foam members 241A and 241B made of SCF support the second low pass filter 212 at nodes of the standing vibration waves, accordingly loss of elastic energy due to the deformation during vibration is suppressed. In other words, since the adhesion of the SCF to the second low pass filter 212 is low and also the contact area between them is small, accordingly the vibration of the second low pass filter 212 is not easily attenuated. The fact that the adherence is low originates in the fact that, when the SCF itself deforms so as to match the deformation of the second low pass filter 212 (thus following that deformation), its response speed is slow.

On the other hand, the adhesion to the second low pass filter 212 of the second foam member 242 made of Poron is high, and the second foam member 242 supports the second low pass filter 212 with its surface of the Poron. While the vibration of the second low pass filter 212 is quite easily attenuated by the second foam member 242 because the contact area between them is wide as compared to that of the first foam members 241A and 241B, the anti-dust performance is high, because the adhesion of the second foam member 242 to the second low pass filter 212 is good. The fact that its adherence is high originates in the fact that, when the Poron itself deforms so as to match the deformation of the second low pass filter 212 (thus following that deformation), its response speed is fast.

To put it in another manner, with the second foam member 242, the force with which it tends to return to its original condition when it has been deformed (i.e. its restoring force or resilient force) is strong, as compared to that of the first foam members 241A and 241B. In other words, the modulus of elasticity of the second foam member 242 is higher than the modulus of elasticity of the first foam members 241A and 241B, so that its stress is large with respect to deformation (distortion).

It should be understood that the frequency of the standing waves that are set up in the second low pass filter 212 by the second low pass filter 212 being vibrated due to the vibration of the vibration plates 261 and 262 is controlled by the phase and the frequency of the drive signal that is supplied from the vibration plate control device 151 to the vibration plates 261 and 262. In this embodiment, the frequency of the standing vibration waves is controlled so that a predetermined number of antinodes of the standing vibration waves appear along the long sides of the second low pass filter that extend along the horizontal direction, and moreover so that this frequency is one that the second foam member 242 made of Poron can follow while it is also a frequency that the first foam members 241A and 241B made of SCF cannot follow.

Due to this, along with the first foam members 241A and 241B supporting the second low pass filter 212 at the nodes of the standing vibration waves, the second foam member 242 also supports the second low pass filter 212 with its surface.

According to the first embodiment as explained above, the following advantageous effects are obtained.

(1) It is arranged to support the second low pass filter 212 by the first foam members 241A and 241B and the second foam member 242 whose response speeds for following deformation of the second low pass filter 212 are different from one another. For example, if the foam members described above are made so that one is appropriate for use in the case in which anti-dust performance is required, and the other is appropriate for use in the case in which vibration performance when elimination of dust is required, then it is possible to suppress decrease of the vibration performance in an appropriate manner.

(2) Since the second foam member 242 is disposed on the side of the second low pass filter 212 towards the imaging element 250, while the first foam members 241A and 241B are disposed on the opposite side of the second low pass filter 212 from the imaging element 250, accordingly it is possible to dispose foam materials that are individually suited to the side at which it is desired for the space to be sealed, and to the side at which vibration performance is required.

(3) Since it is arranged for the response speed of the second foam member 242 with respect to deformation of the second low pass filter 212 to be faster than the response speed of the first foam members 241A and 241B with respect to deformation of the second low pass filter 212, accordingly the adherence of the second foam member 242 to the second low pass filter 212 at its side towards the imaging element 250 is high, while on the other hand, on the opposite side thereof, the vibration performance of the second low pass filter 212 is not easily decreased. In other words, the adherence of the second foam member 242 is high to the surface of the second low pass filter 212 on its side at which it is desired to prevent the ingress of dust or the like, while still it is possible to suppress the attenuation of vibration on its side at which it is desired to eliminate dust.

(4) Since the vibration plates 261 and 262 are provided on the opposite side of the second low pass filter 212 from the imaging element 250, accordingly it is possible to apply vibration to the side on which it is desired to eliminate dust with good efficiency.

(5) It is arranged to provide the foam members 241A and 241B, and the foam member 242, at both sides of the second low pass filter 212. Thus, since the response speeds of these foam members are slower than that of rubber (for example), accordingly it is possible to suppress the attenuation of vibration in an appropriate manner, as compared to the case in which a material such as rubber or the like is used for supporting the second low pass filter 212 at one or both of its sides.

(6) Since the first foam members 241A and 241B are disposed so as to be parallel to the vibration plates 261 and 262, accordingly it is possible to suppress the attenuation of the vibration in a more appropriate manner, than would be the case if the first foam members 241A and 241B were disposed so as to be orthogonal to the vibration plates 261 and 262.

(7) Since the second foam member 242 is made in the shape of a frame and thus also serves as a shielding member for defining the space into which ingress of dust and the like is prevented, accordingly it is possible to minimize the number of components that contact the second low pass filter 212, and thereby to suppress the attenuation of vibration in an even more appropriate manner, as compared with providing a shielding member shaped as a frame separately from a support member made from foam.

(8) Since it is arranged to control the frequency of the standing vibration waves of the second low pass filter 212 to a frequency that the second foam member 242 can follow, and that the first foam members 241A and 241B cannot follow, accordingly it is possible to increase the adherence of the second foam member 242 to the second low pass filter 212 on its side at which it is desired reliably to prevent the ingress of dust, while at the same time suppressing the attenuation of vibration of the second low pass filter 212 on its side at which it is desired to eliminate dust and so on.

Embodiment 2

In the first embodiment described above, the first low pass filter 211 and the mask 202 were pressed towards the holder 201 by the fixing member 203. Instead of this, it would also be acceptable to provide a structure in which these members are pressed towards the holder 201 by a low pass filter pressing frame 205B.

Figure 9:
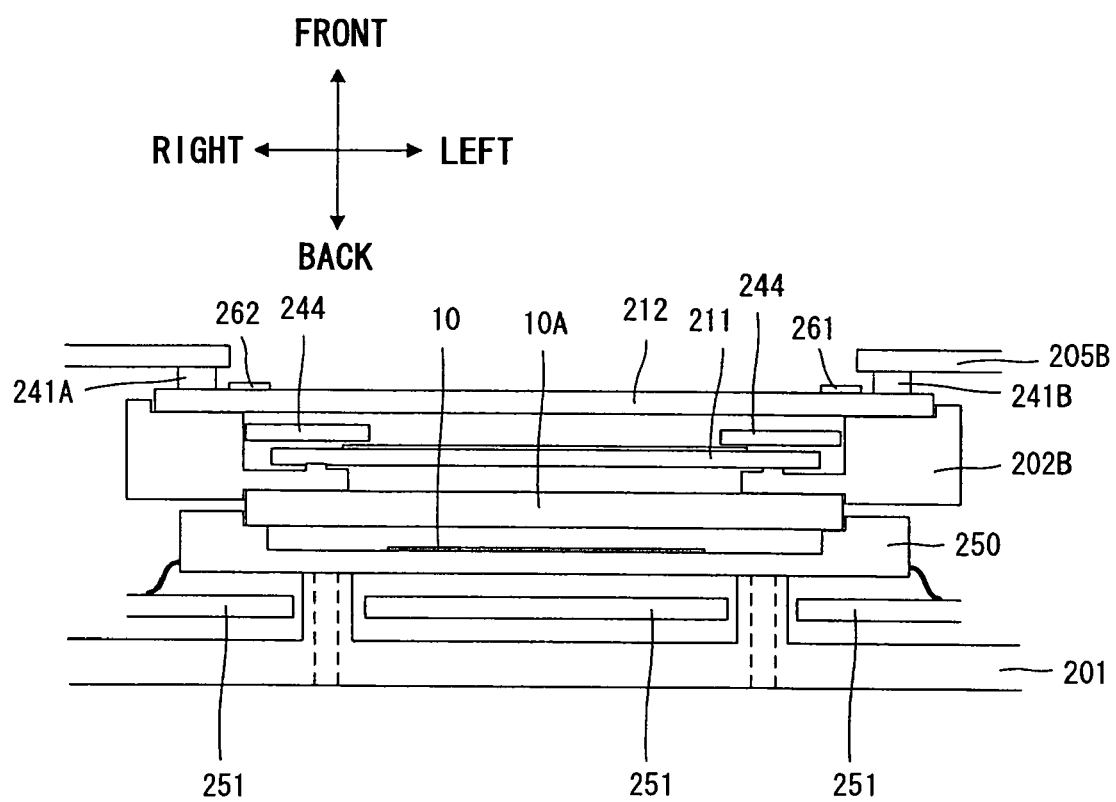
FIG. 9 is a figure showing an example of a cross section of an image-capturing unit according to a second embodiment, as seen from above.

FIG. 9 is a figure for explaining the way in which the second low pass filter 212 of this embodiment is held. This figure shows an example of a cross section, as seen from above the image-capturing unit, just like FIG. 6 for the first embodiment. It should be understood that, in order to make the drawing easier to understand, in this FIG. 9, the front to rear dimension is magnified. As compared to the structure of the first embodiment shown in FIG. 6, here in this second embodiment, the second foam member 242, the sealing member 243, and the mask 202 are omitted. Moreover other features in which this construction differs from that shown in FIG. 6, are that the location upon the fixing member 203 in which it presses the first low pass filter 211 towards the holder 201 is omitted, and that a positional determination member 202B is added.

In FIG. 9, a cover glass 10A is provided upon the imaging element 250 so as to cover over its imaging surface 10, and the positional determination member 202B is interposed over this cover glass 10A (i.e. in front of it). The positional determination member 202B is a frame shaped member that may, for example, be made of rubber or the like.

A low pass filter pressing frame 205B is a frame shaped member having an approximately rectangular shape, for sandwiching various members such as the second low pass filter 212 against the holder 201. This low pass filter pressing frame 205B is fixed to the fixing member 203 by the screws 291 or the like. And, by the fixing member 203 being fixed to the holder 201 using the fixing member pressing springs 206, the low pass filter pressing frame 205B that is integrated with the fixing member 203 is fixed to the holder 201 by being biased towards the holder 201 (just as shown in FIG. 3).

Since, as described above, the positional determination member 202B is interposed, accordingly the second low pass filter 212 is supported so as to be sandwiched between the first foam members 241 (241A and 241B) in front of the second low pass filter 212, and the positional determination member 202 that is behind the second low pass filter 212. It should be understood that a sheet 244 is interposed, so that the first low pass filter 211 and the second low pass filter 212 do not come into mutual contact when the second low pass filter 212 vibrates.

The first foam members 241A and 241B and the positional determination member 202B are made so that, in the state in which the low pass filter pressing frame 205B is fixed to the holder 201, their thicknesses in the fore-and-aft direction are crushed by predetermined amounts. Due to this, the second low pass filter 212 can be sandwiched at a predetermined pressure by the first foam members 241A and 241B and the positional determination member 202B. In other words, by the first foam members 241A and 241B and the positional determination member 202B being compressed with respect to their original thicknesses at predetermined compression ratios, resilient forces (restoring forces) are created in the first foam members 241A and 241B and the positional determination member 202B according to their compression ratios, and these forces operate to sandwich the second low pass filter 212.

In this embodiment, a predetermined number of antinodes of the standing vibration waves appear along the long sides of the second low pass filter 212 that extend in the left and right direction, and moreover the frequency of these standing vibration waves is controlled so as to be a frequency that the positional determination member 202B made of rubber can follow, but that the first foam members 241A and 241B made of SCF cannot follow.

Due to this, along with the first foam members 241A and 241B supporting the second low pass filter 212 at the nodes of its standing vibration waves, also the positional determination member 202B supports the second low pass filter 212 at its surface.

According to the second embodiment explained above, it is arranged to dispose the first foam members 241A and 241B on the opposite side of the second low pass filter 212 from the imaging element 250. The positional determination member 202B that is made of rubber is disposed at the side of the second low pass filter 212 that faces towards the imaging element 250. Since the response speed of the foam members is lower than that of rubber, accordingly, if the frequency of the standing vibration waves is controlled so as to be a frequency that the rubber can follow, but that the SCF cannot follow, then it becomes difficult for the vibration performance of the second low pass filter 212 on its side on which it is desired to eliminate dust and the like to be decreased. As a result, it is possible reliably to enhance the adherence of the positional determination member 202B to the side of the second low pass filter 212 at which it is desired to prevent the ingress of dust and so on, while at the same time it is possible to suppress attenuation of vibration on the side of the second low pass filter 212 at which it is desired to eliminate such dust.

Variant Embodiment 1

In the first embodiment and the second embodiment described above, examples were explained in which the second low pass filter 212 was sandwiched between different members on its front side and its rear side. Instead of this, it would also be acceptable to arrange to hold the second low pass filter 212 with a holding member 301 that is made as an integrated foam member.

Figure 10:
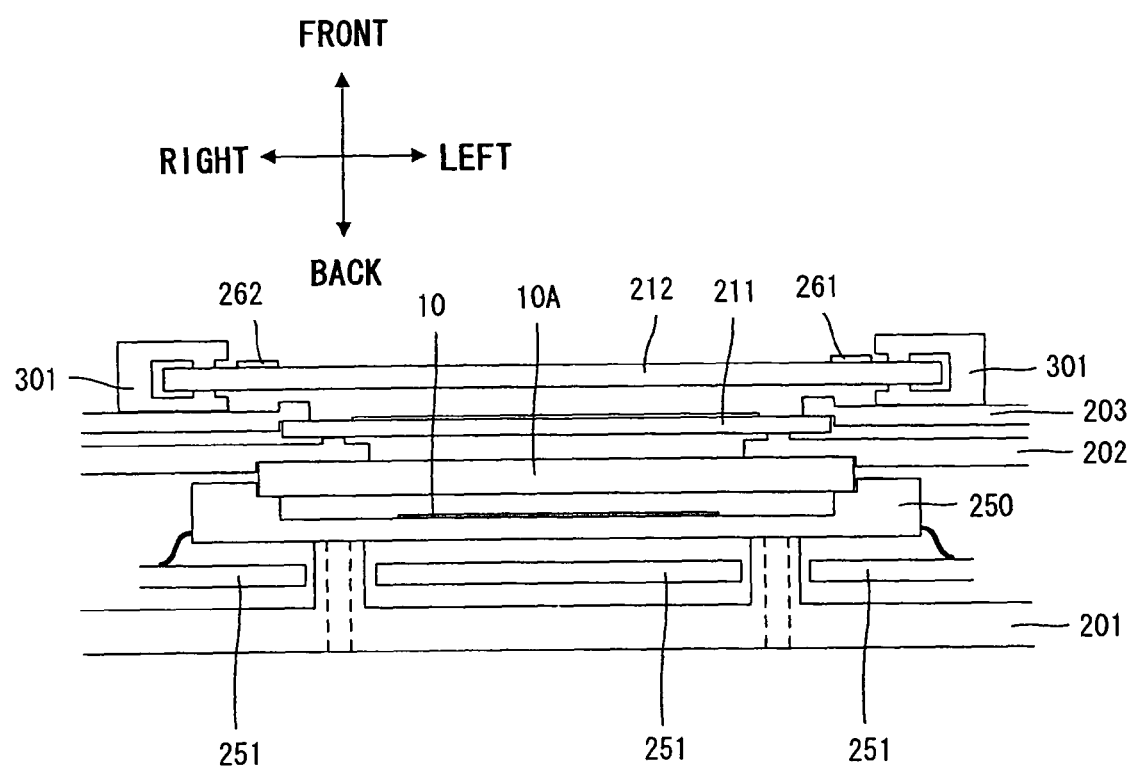
FIG. 10 is a figure showing an example of a cross section of an image-capturing unit according to a first variant embodiment, as seen from above.

FIG. 10 is a figure for explanation of this holding construction for the second low pass filter 212 according to this variant embodiment. This figure shows an example of a cross section of the image-capturing unit as seen from above, like FIG. 6 for the first embodiment. It should be understood that the dimension in the fore-and-aft direction is magnified in this FIG. 10, in order to make the drawing easier to understand. As compared to FIG. 6 for the first embodiment described above, this FIG. 10 differs from the case of FIG. 6 in which the first foam members 241A and 241B, the second foam member 242, the sealing member 243, and the low pass filter pressing frame 205 are eliminated. Moreover, the holding member 301 is added.

In FIG. 10, a cover glass 10A is provided upon the imaging element 250 so as to cover over its imaging surface 10, and the mask 202 is disposed over that (i.e. in front thereof). And the feature than the first low pass filter 211 is pressed by the fixing member 203 in the direction towards the cover glass 10A (i.e. rearwards) is the same as in the case of FIG. 6.

The holding member 301 is a member that is made from an olefin type foam material such as SCF, and is fixed by being adhered over the fixing member 203 (i.e. on its front side). This holding member 301 holds the second low pass filter 212 by surrounding and enveloping its edge. The holding member 301 is made so that, in its state in which it is holding the second low pass filter 212 in this manner, its thickness in the fore-and-aft direction is squeezed by a predetermined amount. Due to this, the holding member 301 is able to hold the second low pass filter 212 with a predetermined pressure.

According to this variant embodiment described above, it is arranged to support the second low pass filter 212 with the holding member 301 that is made of a foam material. Since the response speed of such a foam material is slower than that of, for example, rubber, accordingly it is possible to suppress the attenuation of the vibration of the second low pass filter 212 in a more appropriate manner, as compared with the case of using a material such as rubber or the like.

Variant Embodiment 2

While, in the above explanation, cases were described in which SCF was suggested as one possible material for the olefin type foam members, and Poron was suggested as one possible member for the urethane type foam members, it would also be possible to utilize some other foam material. The speed at which a foam material follows the vibration of the second low pass filter 212 is closely correlated with the density of the air bubbles that are included in that foam material, and to the size of these air bubbles. Accordingly, the type of the foam material that is used should be selected appropriately according to the size of the second low pass filter 212 that is to be held, and according to the frequency of the standing waves during the vibration. Even if the same material (for example, an olefin type material or a urethane type material) is used for the foam members, if the density of the air bubbles and their sizes are different, then similar operation and similar beneficial effects can be obtained, as when using different materials for the foam members. Moreover, it would also be acceptable to hold the second low pass filter 212 by using some material other than a foam material. It will be acceptable to arrange to hold the second low pass filter 212 with any materials, provided that the material on the side of the second low pass filter 212 that faces towards the imaging element 250, in other words on the side thereof at which it is desired to prevent the ingress of dust, is a material whose response speed to follow deformation of the second low pass filter 212 is relatively fast, and that the material that is used on the opposite side of the second low pass filter 212, in other words on the side thereof at which it is desired to eliminate dust and the like, is a material whose response speed to follow deformation of the second low pass filter 212 is relatively slow.

The embodiments described above are only examples, and their structure is not to be considered as being limitative of the present invention.

What is claimed is:

1. An image capturing device, comprising:
   an imaging element that captures an image of a photographic subject;
   an optical member that is disposed over an imaging surface of the imaging element;
   a vibration application member that applies vibration to the optical member; and
   a support assembly including a non-metallic first support member and a non-metallic second support member for supporting the optical member, the first support member and the second support member being configured to follow the deformation of the vibrating optical member with individual speeds different from each other.

2. An image capturing device according to claim 1, wherein:
   the support assembly holds the optical member between the first support member and the second support member;
   the second support member is disposed on a side of the optical member facing towards the imaging element; and
   the first support member is disposed on a side of the optical member opposite to the side on which the second support member is disposed.

3. An image capturing device according to claim 2, wherein the speed at which the second support member follows the deformation of the optical member is faster than the speed at which the first support member follows the deformation of the optical member.

4. An image capturing device according to claim 2, wherein the second support member also serves as a shield member that closes a space defined between the optical member and the imaging element.

5. An image capturing device according to claim 2, wherein the vibration application member applies vibration to the optical member so that the optical member vibrates at a frequency that the first support member does not follow, and that the second support member does follow.

6. An image capturing device according to claim 1, wherein the speed with which the second support member follows the deformation of the optical member is faster than the speed with which the first support member follows the deformation of the optical member.

7. An image capturing device according to claim 1, wherein the vibration application member applies vibration to the optical member on a side facing away from the imaging element.

8. An image capturing device according to claim 1, wherein, in the support assembly, at least the first support member is made of a foam material.

9. An image capturing device according to claim 8, wherein, in the support assembly, the second support member is also made of a foam material.

10. An image capturing device according to claim 1, wherein the first support member is arranged to extend along the vibration application member.

11. An image capturing device according to claim 1, wherein the second support member also serves as a shielding member that closes a space defined between the optical member and the imaging element.

12. An image capturing device according to claim 1, wherein the vibration application member applies vibration to the optical member so that the optical member vibrates at a frequency that the first support member does not follow, and that the second support member does follow.

13. An image capturing device, comprising:
an imaging element that captures an image of a photographic subject;
an optical member that is disposed over an imaging surface of the imaging element;
a vibration application member that applies vibration to the optical member; and
a support member that supports the optical member, and that is made of a foam material.

14. An image capturing device according to claim 13, wherein:
the support member includes a first support member and a second support member;
the first support member supports the optical member at nodes of a standing vibration wave applied to the optical member by the vibration application member; and
the second support member supports the optical member at positions including at least the nodes and antinodes of the standing vibration wave.

15. An image capturing device according to claim 13, wherein:
the support member includes a first support member and a second support member; and
when the optical member is vibrated by the vibration application member applying the vibration to the optical member, a contact area between the first support member and the optical member is smaller than a contact area between the second support member and the optical member.

16. An image capturing device according to clam 13, wherein:
the support member includes a first support member and a second support member; and
when the optical member is vibrated by the vibration application member applying the vibration to the optical member, the attenuation level of the vibration of the optical member by the second support member is higher than the attenuation level of the vibration of the optical member by the first support member.

17. An image capturing device according to claim 13, wherein the support member includes a first support member and a second support member that are made of different materials from each other.

18. An image capturing device according to claim 13, wherein:
the support member includes a first support member and a second support member that are made of foam materials; and
the first support member and the second support member are different from each other in density or size of air bubbles.

19. An image capturing device, comprising:
an imaging element that captures an image of a photographic subject;
an optical member that is disposed over an imaging surface of the imaging element;
a vibration application member that applies vibration to the optical member; and
a support assembly including a first support member and a second support member to support the optical member, wherein the second support member serves as a shielding member that closes a space defined between the optical member and the imaging element.

20. An image capturing device according to claim 19, wherein:
the first support member supports the optical member at nodes of a standing vibration wave applied to the optical member by the vibration application member; and
the second support member supports the optical member at positions including at least the nodes and antinodes of the standing vibration wave.

21. An image capturing device according to claim 19, wherein, when the optical member is vibrated by the vibration application member applying the vibration to the optical member, a contact area between the first support member and the optical member is smaller than a contact area between the second support member and the optical member.

22. An image capturing device according to claim 19, wherein, when the optical member is vibrated by the vibration application member applying the vibration to the optical member, an attenuation level of the vibration of the optical member by the second support member is higher than an attenuation level of the vibration of the optical member by the first support member.

23. An image capturing device according to claim 19, wherein the first support member and the second support member are made of different materials from each other.

24. An image capturing device according to claim 19, wherein:
the first support member and the second support member are made of foam materials; and
the first support member and the second support member are different from each other in density or size of air bubbles.

* * * * *